US006924351B2

(12) United States Patent
Gralinski et al.

(10) Patent No.: US 6,924,351 B2
(45) Date of Patent: Aug. 2, 2005

(54) METHOD OF PROCESSING POLYETHYLENE RESINS

(75) Inventors: Tomasz J. Gralinski, Ashwood (AU); Thomas R. Rios, Highlands, TX (US); Carl Dean Heard, Houston, TX (US); W. Bing Kao, Houston, TX (US); Joanne K. Pabst, Crosby, TX (US); Wesley J. Robertson, Humble, TX (US); Joel E. Schmieg, Humble, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 51 days.

(21) Appl. No.: 10/458,827

(22) Filed: Jun. 11, 2003

(65) Prior Publication Data

US 2003/0230820 A1 Dec. 18, 2003

Related U.S. Application Data

(60) Provisional application No. 60/388,910, filed on Jun. 14, 2002.

(51) Int. Cl.$^7$ .................................................. C08J 5/18
(52) U.S. Cl. ................ 528/483; 528/502 R; 528/502 F
(58) Field of Search ............................ 528/483, 502 R, 528/502 F; 428/402, 523

(56) References Cited

U.S. PATENT DOCUMENTS

| 3,684,252 A | | 8/1972 | Nissle et al. ................... 259/9 |
| 3,799,234 A | | 3/1974 | Skidmore ................... 159/2 E |
| 3,963,558 A | | 6/1976 | Skidmore ................... 159/2 E |
| 4,341,891 A | * | 7/1982 | Gessell et al. ............... 528/483 |
| 5,409,646 A | * | 4/1995 | Menon et al. ................. 264/28 |
| 5,707,573 A | * | 1/1998 | Biesenberger et al. ........ 264/50 |
| 6,106,761 A | | 8/2000 | Sjöberg et al. ............. 264/492 |
| 6,369,192 B1 | | 4/2002 | Dufresne et al. ........... 528/483 |

FOREIGN PATENT DOCUMENTS

| EP | 0 404 552 | 12/1990 | ........... C08L/23/04 |

* cited by examiner

Primary Examiner—Fred Teskin

(57) ABSTRACT

Process for pelletizing polyethylene resin are disclosed, the processes providing pelletized resin having reduced occurrence of defects such as black specks. Polyethylene resin is conveyed in a downstream direction through a mixer having a feed zone, a melt-mixing zone downstream of the feed zone, and a melt-conveying zone downstream of the melt-mixing zone; contacted with nitrogen gas in the melt-conveying zone; and conveyed through a mixer discharge to form pellets. Also disclosed are processes of forming films from such resins, the films having reduced occurrence of gels, and articles such as blow molded or injection molded articles.

9 Claims, 3 Drawing Sheets

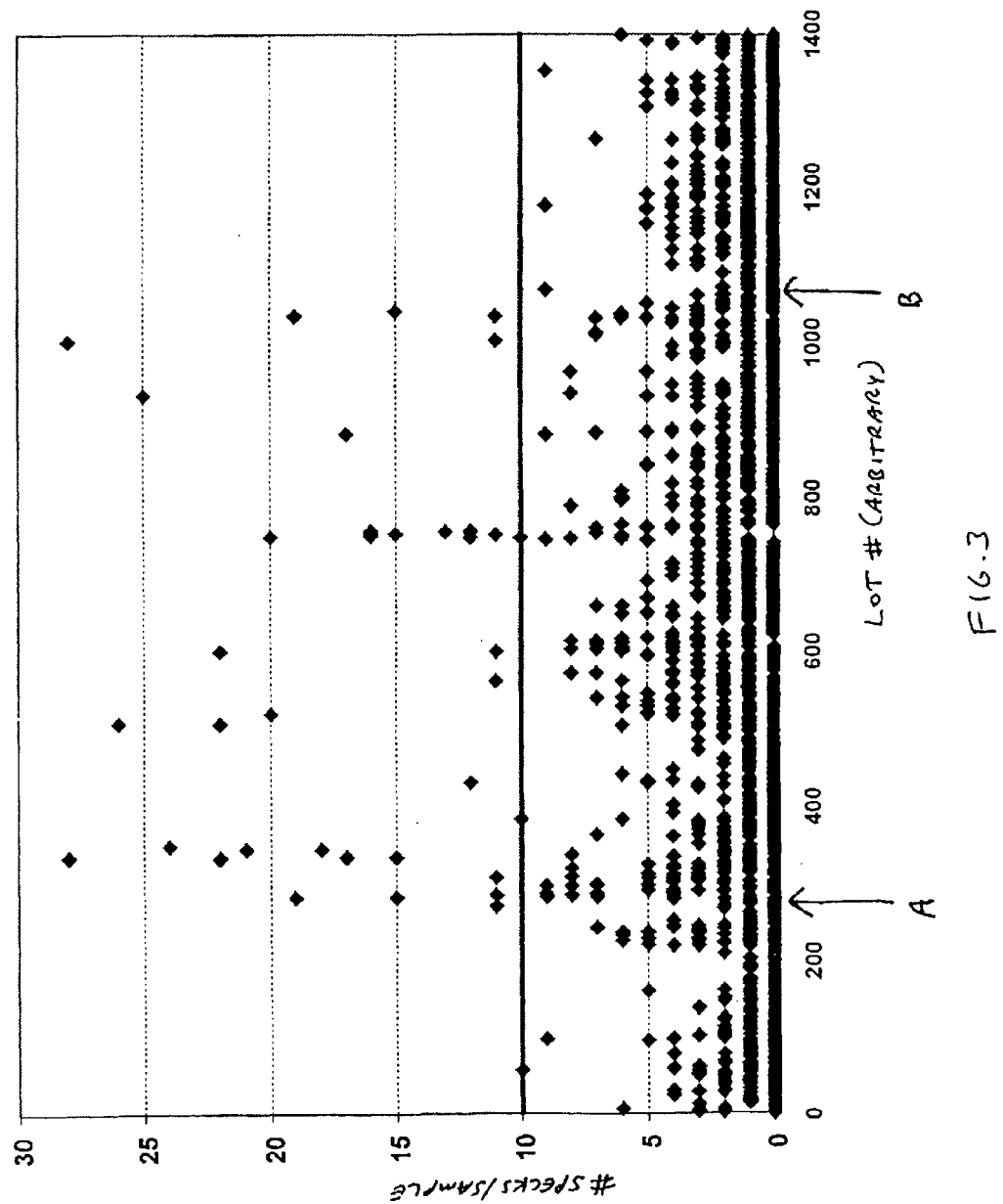

METHOD OF PROCESSING POLYETHYLENE RESINS

CROSS-REFERENCE TO RELATED APPLICATIONS

This application claims the benefit of U.S. Provisional Application No. 60/388,910, filed Jun. 14, 2002, the disclosure of which is incorporated herein by reference in its entirety.

FIELD OF THE INVENTION

The present invention is directed to methods of processing polyethylene homopolymer and copolymer resins. More particularly, the invention provides methods of compounding and/or pelletizing polyethylene resins to reduce oxidative contamination of the resin and reduce the number of gels in films including such resins.

BACKGROUND

Granular polyethylene resins produced in polymerization reactors are often compounded with conventional additives, such as ultraviolet stabilizers, antioxidants, antiblock agents, slip agents, processing aids, and other additives well-known in the art. With or without addition of such additives, granular resins are frequently pelletized for ease in handling and transportation. Both of these processes, compounding and pelletization, can be carried out in mixers characterized by a feeding section where the granular resin is introduced to the mixer, and various zones in which the resin is fully or partially melted and mechanically mixed, typically by action of co- or counter-rotating, intermeshing or non-intermeshing twin screws. The resin is ultimately conveyed through a mixer discharge to form pellets, or directly conveyed to an extruder and further processed, such as by blowing or casting into a film.

Undesirable characteristics of polyethylene resins which are processed in such mixers include the presence of small, black particles ("black specks") which appear in the pelletized resin and in articles subsequently formed of such resin, and imperfections generically termed "gels" which are apparent especially in films formed of such resins. The presence of black specks and gels makes the resin unusable for many commercial purposes, and such resins must be used as sub-prime or off-spec material. Problems of black specks and gels are generally more prevalent in resins processed in mixers, such as compounding/pelletizing mixers, and less prevalent in resins processed in extruders. However, it is often desirable to process polyethylene resins in a mixer rather than an extruder, due to the particular resin properties, the intended end use, and the availability of processing equipment in a commercial plant. In addition, increases in black specks and gels are frequently observed in resins after changes in the package of additives used, leading to time-consuming, costly, and often unsuccessful efforts to adjust resin, additive and processing parameters to eliminate such defects.

Documents considered to be relevant include U.S. Pat. No. 6,369,192; EP 0404552; U.S. Pat. No. 3,963,558; U.S. Pat. No. 3,799,234; U.S. Pat. No. 3,684,252; and U.S. Pat. No. 6,106,761.

SUMMARY

In one embodiment, the invention provides a process for pelletizing polyethylene resin by conveying polyethylene resin in a downstream direction through a mixer having a feed zone, a melt-mixing zone downstream of the feed zone, and a melt-conveying zone downstream of the melt-mixing zone; contacting the resin with nitrogen gas in the melt-conveying zone; and conveying the resin through a mixer discharge to form pellets.

In another embodiment, the invention provides a process for pelletizing polyethylene resin by conveying polyethylene resin in a downstream direction through a mixer having a feed zone, a melt-mixing zone downstream of the feed zone, and a melt-conveying zone downstream of the melt-mixing zone; providing nitrogen gas in a downstream portion of the melt-conveying zone and flowing in an upstream direction, the flow of nitrogen gas contacting the resin in the melt-conveying zone; and conveying the resin through a mixer discharge to form pellets.

In another embodiment, the invention provides a process of producing a blown film by providing a pelletized polyethylene resin and melt extruding the resin in a blown film process to form a blown film. The pelletized polyethylene resin is provided by conveying polyethylene resin in a downstream direction through a mixer having a feed zone, a melt-mixing zone downstream of the feed zone, and a melt-conveying zone downstream of the melt-mixing zone; contacting the resin with nitrogen gas in the melt-conveying zone; and conveying the resin through a mixer discharge to form pellets.

In another embodiment, the invention provides a process of producing a blown film by providing a pelletized polyethylene resin and melt extruding the resin in a blown film process to form a blown film. The pelletized polyethylene resin is provided by conveying polyethylene resin in a downstream direction through a mixer having a feed zone, a melt-mixing zone downstream of the feed zone, and a melt-conveying zone downstream of the melt-mixing zone; providing nitrogen gas in a downstream portion of the melt-conveying zone and flowing in an upstream direction, the flow of nitrogen gas contacting the resin in the melt-conveying zone; and conveying the resin through a mixer discharge to form pellets.

In another embodiment, the invention provides a process for decreasing the number of black specks formed in producing pelletized polyethylene resin, by conveying polyethylene resin in a downstream direction through a mixer having a feed zone, a melt-mixing zone downstream of the feed zone, and a melt-conveying zone downstream of the melt-mixing zone; contacting the resin with nitrogen gas in the melt-conveying zone, the nitrogen gas being present in an amount sufficient to reduce the number of black specks formed in the resin; and conveying the resin through a mixer discharge to form pellets.

In another embodiment, the invention provides a process for decreasing the number of gels formed in producing a polyethylene film, by (a) providing a pelletized polyethylene resin by conveying polyethylene resin in a downstream direction through a mixer having a feed zone, a melt-mixing zone downstream of the feed zone, and a melt-conveying zone downstream of the melt-mixing zone; contacting the resin with nitrogen gas in the melt-conveying zone; and conveying the resin through a mixer discharge to form pellets, and (b) melt extruding the pellets in a blown or cast film process to form a film. The amount of nitrogen gas provided is sufficient to reduce the number of gels formed in the film.

In another embodiment, the invention provides a process of producing a molded polyethylene article, by (a) providing a pelletized polyethylene resin by conveying polyethylene resin in a downstream direction through a mixer having a feed zone, a melt-mixing zone downstream of the feed zone, and a melt-conveying zone downstream of the melt-mixing zone; contacting the resin with nitrogen gas in the melt-conveying zone; and conveying the resin through a mixer discharge to form pellets, and (b) injection or blow molding the pellets to form a molded article.

In other embodiments, the invention provides pelletized polyethylene resins, and articles formed from such resins, including blown films, cast films blow molded articles and injection molded articles.

BRIEF DESCRIPTION OF THE DRAWINGS

FIG. 3 is a plot showing the number of black specks observed per sample versus an arbitrarily assigned lot number, before and after addition of nitrogen to the mixer according to the invention.

DETAILED DESCRIPTION

Figure 1:
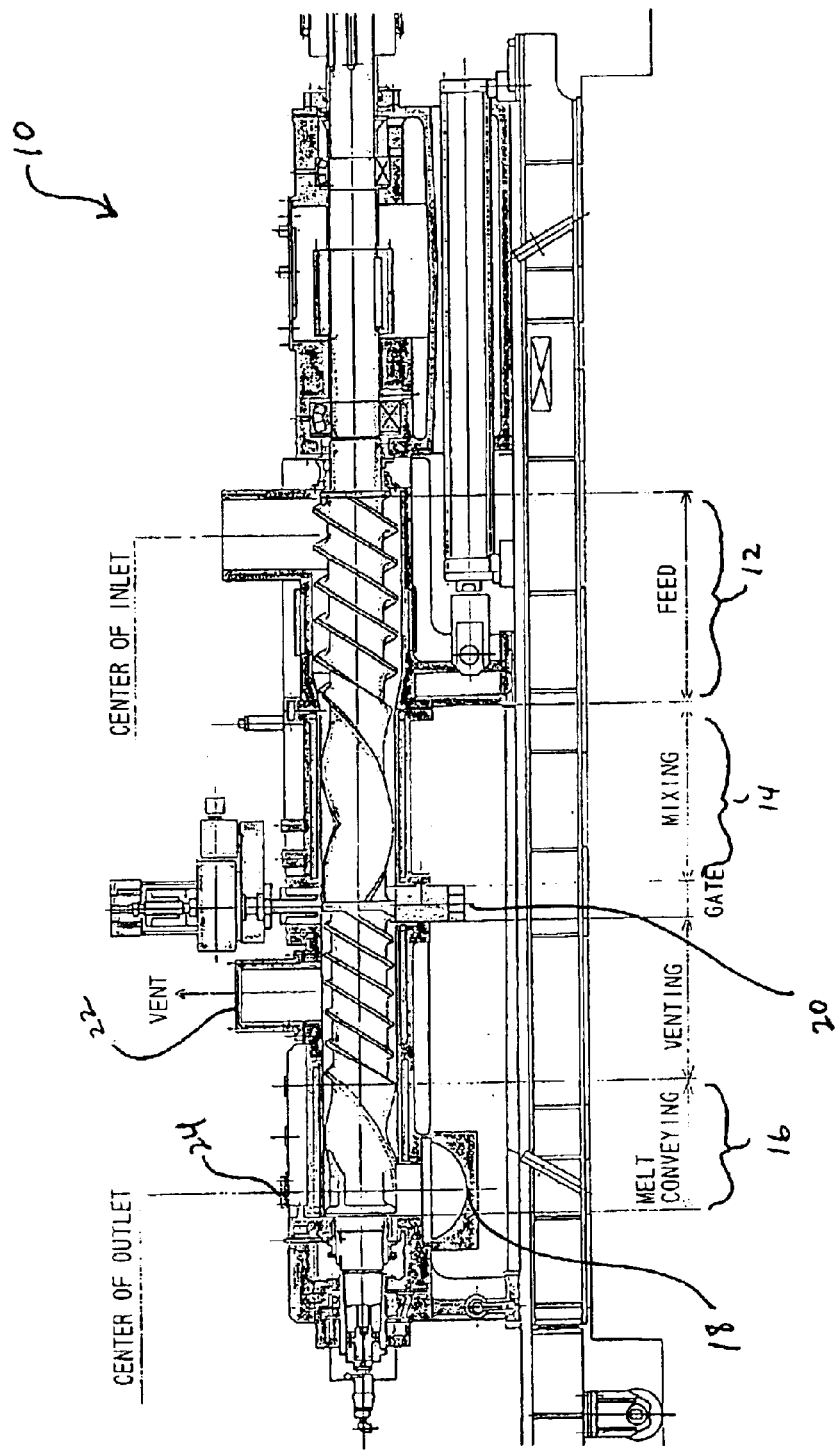
FIG. 1 is a schematic diagram of a Kobe mixer.

The polyethylene resin can be a polyethylene homopolymer or copolymer of ethylene and one or more $C_3$–$C_{20}$ alpha-olefin comonomers. As used herein, the term "ethylene copolymer" indicates a polymer formed of more than 50 mol % polymerized ethylene units, and the remaining less than 50 mol % polymerized units being polymerized α-olefin comonomers, such as $C_3$–$C_{20}$ α-olefins or $C_3$–$C_{12}$ α-olefins. Suitable α-olefin comonomers can be linear or branched, and two or more comonomers can be used, if desired. Examples of suitable comonomers include linear $C_3$–$C_{12}$ α-olefins, and α-olefins having one or more $C_1$–$C_3$ alkyl branches, or an aryl group. Specific examples include propylene; 1-butene, 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. It should be appreciated that the list of comonomers above is merely exemplary, and is not intended to be limiting.

Optionally, other comonomers can be used in minor amounts, such as less than 5 mol %, and such minor comonomers include polar vinyl, conjugated and non-conjugated dienes, acetylene and aldehyde monomers. Non-conjugated dienes useful as comonomers preferably are straight chain, hydrocarbon di-olefins or cycloalkenyl-substituted alkenes, having 6 to 15 carbon atoms. Suitable non-conjugated dienes include, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); and (e) cycloalkenyl-substituted alkenes, such as vinyl cyclohexene, allyl cyclohexene, vinyl cyclooctene, 4-vinyl cyclohexene, allyl cyclodecene, and vinyl cyclododecene.

The polyethylene resin is not particularly limited, as long as the resin can be pelletized in a mixer, and can have a density of from 0.890 to 0.970 g/cm$^3$. Suitable polyethylenes include very low density polyethylene ("VLDPE"), a polyethylene having a density of less than 0.916 g/cm$^3$; low density polyethylene ("LDPE"), a polyethylene having a density in the range of 0.916–0.940 g/cm$^3$; linear low density polyethylene ("LLDPE"), a polyethylene having a density in the range of 0.916 to 0.940 g/cm$^3$, which is linear and does not contain the long chain branching characteristic of LDPE; or high density polyethylene ("HDPEs"), a polyethylene having a density greater than 0.940 g/cm$^3$. Methods of preparing polyethylene resins are well-known in the art, and include gas, slurry and solution processes using metallocene catalysts, Ziegler-Natta catalysts, vanadium catalysts, chromium catalysts, bimetallic catalysts, mixtures of catalysts, or free-radical initiation. The polyethylene resin can also be a mixture of two or more polyethylenes.

The polyethylene resin is processed in a mixer, such as a co- or counter-rotating, intermeshing or non-intermeshing twin screw mixer. Such mixers are well-known in the art, and are commercially available from various sources, such as Kobe and Farrel. The resin is fed to the feeding zone of the mixer, where the temperature is below the melting temperature of the resin as the resin is compressed and conveyed toward the melt-mixing zone. Typically, the temperature in the feeding zone is 20 to 100° C., and is maintained by cooling the extruder walls. In the melt-mixing zone, the temperature is increased to at least partially melt the resin. In the melt zone, the temperature is sufficient to melt essentially all of the resin, to provide a molten polyethylene resin. Each zone is only partially filled with the resin; i.e., there are no completely filled zones. Although the terms "mixer" and "extruder" are often used loosely and interchangeably, one skilled in the art will appreciate that mixers, such as the commercially available Kobe or Farrel mixers, operate at relatively low pressures, typically about 100 psi or less, and the zones within the mixer are generally not completely filled with resin. In contrast, extruders, such as are commercially available from, for example, Werner-Pfleiderer, operate at much higher pressures, typically at least several hundred or several thousand psi, and the various zones within the extruder are generally completely filled with resin.

Although not limited to any particular mixer, a process of the invention is illustrated now by specific reference to FIG. 1, showing a schematic diagram of a Kobe mixer 10. Mixer 10 includes a feed zone 12, a mixing zone 14, and a melt-conveying zone 16. Resin and optional additives are provided to mixer 10 in the feed zone 12, and the resin is conveyed in a downstream direction through the mixing zone 14 and the melt-conveying zone 16. As described above, the resin is generally at least partially melted in mixing zone 14, and generally, but not necessarily, essentially completely melted in melt-conveying zone 16. The resin is conveyed through the mixer discharge 18 and further processed, such as by pelletizing.

It has been surprisingly found that by contacting the resin in the melt-conveying zone with nitrogen gas, the occurrence of black specks in resin pellets and the occurrence of gels in films subsequently formed from the resin is greatly reduced. Nitrogen can be provided in the melt-conveying zone at any convenient location or locations. Gate 20 separates the mixing zone from the melt-conveying zone, and nitrogen gas can be added anywhere downstream of the gate 20. FIG. 1 shows an optional vent 22 in the melt-conveying zone 16. If vent 22 is present, the nitrogen gas is preferably provided downstream of vent 22. In a particular embodiment, nitrogen gas is provided through an inlet 24 positioned at or near the downstream end of the melt-conveying zone 16 and adjacent to the mixer discharge 18.

Advantageously, nitrogen can be provided as a continuous flow of gas into the melt-conveying zone 16. Alternatively, nitrogen can be provided intermittently. Although not wishing to be bound by theory, it is believed that the black specks and gels are caused by oxidized polymer and/or oxidized additive, and that the presence of nitrogen in the melt-conveying zone 16 displaces oxidizing agents such as $O_2$ present in the melt-conveying zone. Thus, it is believed that nitrogen gas is advantageously present in an amount sufficient to displace substantially all of the gaseous oxidizing agents present in the melt-conveying zone. In one embodiment, nitrogen gas is provided as a flow of nitrogen gas into a downstream portion of the melt-conveying zone 16, such as through inlet 24, and allowed to flow in an upstream direction toward the gate 20. The gas can escape through vent 22, if present, or through orifices, not shown, in gate 20.

Figure 2:
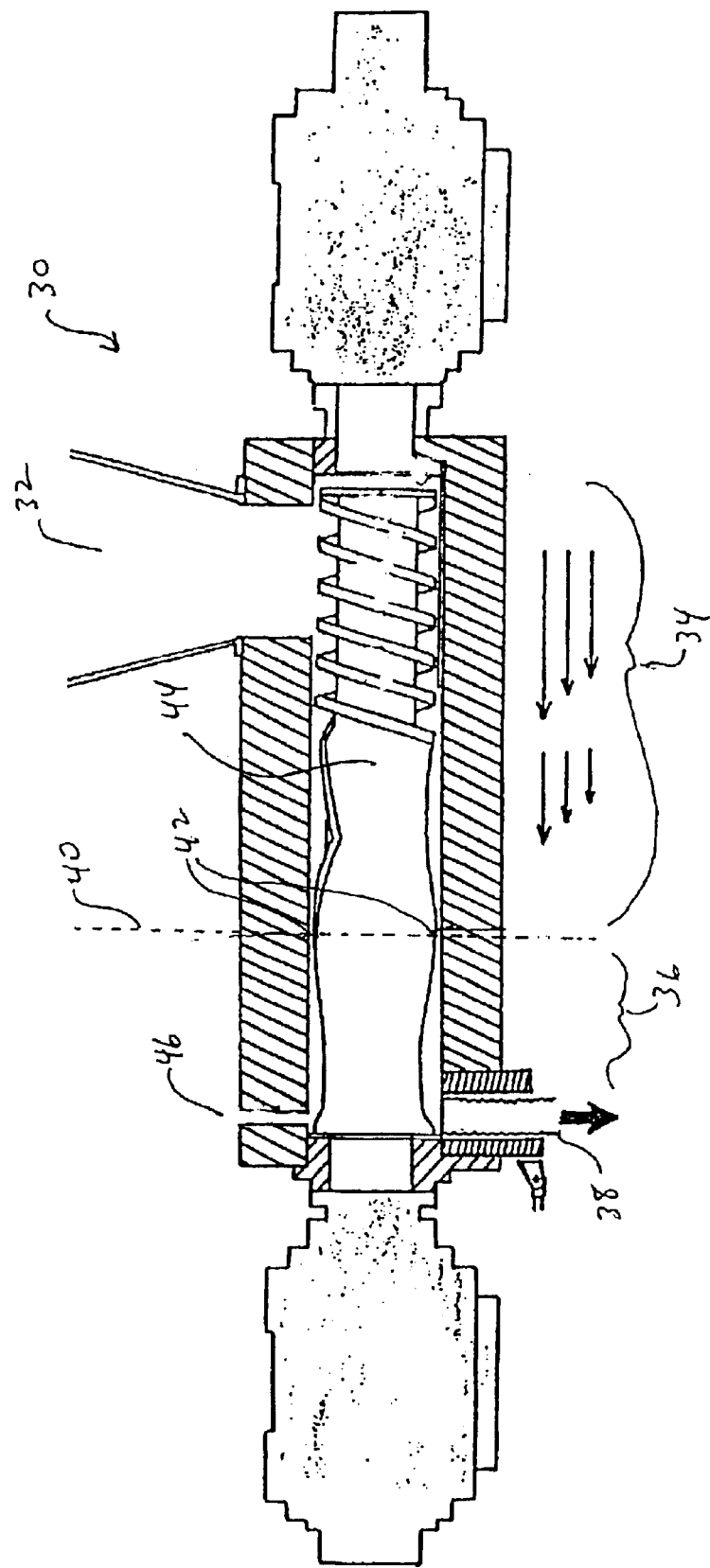
FIG. 2 is a schematic diagram of a Farrel mixer.

Turning now to FIG. 2, a process of the invention is illustrated with specific reference to a Farrel mixer 30. Mixer 30 includes a feed zone 32, a mixing zone 34, and a melt-conveying zone 36. Resin and optional additives are provided to mixer 30 in the feed zone 32, and the resin is conveyed in a downstream direction through the mixing zone 34 and the melt-conveying zone 36. As described above, the resin is generally at least partially melted in mixing zone 34, and generally, but not necessarily, essentially completely melted in melt-conveying zone 36. The resin is conveyed through the mixer discharge 38 and further processed, such as by pelletizing. The Farrel mixer does not have a gate such as gate 20 of the Kobe mixer separating the mixing zone from the melt-conveying zone. However, mixing zone 34 and melt-conveying zone 36 are effectively separated by a narrow clearance region shown by dashed line 40 corresponding to the apex 42 of mixing element 44. Nitrogen can be provided in the melt-conveying zone 36 at any convenient location or locations downstream of apex 42. In a particular embodiment, nitrogen gas is provided through an inlet 46 positioned at or near the downstream end of the melt-conveying zone 36 and adjacent to the mixer discharge 38.

Advantageously, nitrogen can be provided as a continuous flow of gas into the melt-conveying zone 36, or intermittently. In one embodiment, nitrogen gas is provided as a flow of nitrogen gas into a downstream portion of the melt-conveying zone 36, such as through inlet 46, and allowed to flow in an upstream direction toward apex 42. The gas can escape through the narrow clearance region adjacent apex 42.

It should be appreciated that mixers other than the Kobe and Farrel mixers illustrated herein can be used.

Nitrogen gas can be provided as an essentially pure gas, or as part of a gas mixture. It should be appreciated, however, that the presence of oxidizing agents in a gas mixture is disadvantageous. It should further be appreciated that gases other than nitrogen can be used, provided that the gas is non-oxidizing.

Nitrogen gas can be used in any amount sufficient to reduce the occurrence of gels and black specks. Suitable flow rates, for example, can range from 0.5 or 1.0 or 2.0 or 3.0 standard cubic feet per minute ("SCFM") to 30 or 25 or 20 or 15 or 10 SCFM, with ranges from any lower limit to any upper limit being contemplated.

In some embodiments, the resin can be further processed to form a film. The films can be cast films or blown films. The films can further be embossed, or produced or processed according to other known film processes. The films can be tailored to specific applications by adjusting the thickness, materials and order of the various layers, as well as the additives in each layer. Further, the films can be monolayer or multilayer films. Further, films of the invention can be used in any typical film application, such as stretch films, shrink films, packaging films, bags, and other film applications known in the art.

Processes to form cast films are well-known. For example, a composition can be extruded in a molten state through a flat die and then cooled to form a film. As a specific example, cast films can be prepared using a pilot scale commercial cast film line machine as follows. Pellets of the polymer are melted at a temperature ranging from about 250° C. to about 300° C., with the specific melt temperature being chosen to match the melt viscosity of the particular resins. In the case of a multilayer cast film, the two or more different melts are conveyed to a coextrusion adapter that combines the two or more melt flows into a multilayer, coextruded structure. This layered flow is distributed through a single manifold film extrusion die to the desired width. The die gap opening is typically about 0.025 inches (about 600 $\mu$m). The material is then drawn down to the final gauge. The material draw down ratio is typically about 21:1 for 0.8 mil (20 $\mu$m) films. A vacuum box or air knife can be used to pin the melt exiting the die opening to a primary chill roll maintained at about 90° F. (32° C.). The resulting polymer film is collected on a winder. The film thickness can be monitored by a gauge monitor, and the film can be edge trimmed by a trimmer. One or more optional treaters can be used to surface treat the film, if desired. Such chill roll casting processes and apparatus are well known in the art, and are described, for example, in The Wiley Encyclopedia of Packaging Technology, Second Edition, A. L. Brody and K. S. Marsh, Ed., John Wiley and Sons, Inc., New York (1997). Although chill roll casting is one example, other forms of casting can be used.

Blown film processes are also well-known. For example, a composition can be extruded in a molten state through an annular die and then blown and cooled to form a tubular, blown film, which can then be axially slit and unfolded to form a flat film. As a specific example, blown films can be prepared as follows. The resin is conveyed to an extruder, such as a 63.5 mm Egan extruder that is water-cooled, resistance heated, and has an L/D ratio of 24:1. The film can be produced using a 15.24 cm Sano die with a 2.24 mm die gap, along with a Sano dual orifice non-rotating, non-adjustable air ring. The film is extruded through the die into a film that was cooled by blowing air onto the surface of the film. The film is drawn from the die typically forming a cylindrical film that is cooled, collapsed and optionally subjected to a desired auxiliary process, such as slitting, treating, sealing or printing. The finished film can be wound into rolls for later processing, or can be fed into a bag machine and converted into bags. A particular blown film process and apparatus suitable for forming films according to embodiments of the present invention is described in U.S. Pat. No. 5,569,693. Of course, other blown film forming methods can also be used.

In other embodiments, the resin can be further processed by injection molding to form an injection-molded article. Methods of injection molding are well-known in the art.

In other embodiments, the resin can be further processed by blow molding to form a blow-molded article. Methods of blow molding are well-known in the art.

EXAMPLES

Polyethylene copolymer resins were produced in a gas phase fluidized bed reactor, and processed in a Kobe mixer to form pellets. A wide variety of resins was produced, but generally the resins were LLDPE resins using butene or hexene comonomers and Ziegler-Natta catalysts.

Examples 1–2

In Examples 1 and 2 and Comparative Examples 1 and 2, pelletized Ziegler-Natta LLDPE resins were processed in a Kobe mixer then formed into monolayer blown films on an Alpine film line equipped with an optical system for detecting gels, available from Intec. The optical system scans the film as it is produced using an optical source such as a laser, and detects the presence of gels using fluctuations in transmitted intensity, scattered light, or other indicator. Alternatively, the occurrence and number of gels can be determined by manual inspection of the finished film. These Examples are summarized in Table 1, showing the average number of gels detected per 1000 feet of film.

In Comparative Example 1, 17 resin samples were tested, without the use of nitrogen in the Kobe mixer. In Example 1, 8 resin samples were tested, with addition of from 1–4 SCFM nitrogen gas introduced through inlet 24 as shown in FIG. 1. Addition of nitrogen reduced the occurrence of gels by 80%. The resins used in Example 1 and Comparative Example 1 each contained the same conventional additive package, including antioxidants and processing aids.

Example 2 and Comparative Example 2 were carried out in the same way with the same resin as in Example 1 and Comparative Example 1, except that a different package of additives was used. The addition of nitrogen reduced the occurrence of gels by 50%.

TABLE 1

| | # Samples | Average Gels (# gels per 1000 ft) | Standard Deviation |
|---|---|---|---|
| Comparative Example 1 | 17 | 551 | 220 |
| Example 1 | 8 | 111 | 40 |
| Percent Decrease | | 80% | |
| Comparative Example 2 | 37 | 343 | 184 |
| Example 2 | 14 | 170 | 104 |
| Percent Decrease | | 50% | |

Example 3

In Example 3, resins were processed in a Kobe mixer and sampled in amounts of 2–5 pounds. Each sample was visually inspected for a fixed period of time, typically 1 minute, and the number of black specks observed was recorded. FIG. 3 shows a plot of the average number of specks observed per sample for several hundred samples. Point A corresponds to a change in additive package that unexpectedly and adversely affected the frequency of black speck occurrence. In the resins processed and sampled between points A and B, no nitrogen was used in the mixer. Beginning at point B, the resins processed and sampled were contacted with nitrogen as described herein, resulting in a dramatic decrease in the occurrence of black specks. The horizontal line at 10 is the nominal limit for number of specks per sample for a resin to be considered "on-spec".

All patents, test procedures, and other documents cited herein, including priority documents, are fully incorporated by reference to the extent such disclosure is not inconsistent with this invention and for all jurisdictions in which such incorporation is permitted.

What is claimed is:

1. A process for pelletizing polyethylene resin, the process comprising:
   (a) conveying polyethylene resin in a downstream direction through a mixer having a feed zone, a melt-mixing zone downstream of the feed zone, and a melt-conveying zone downstream of the melt-mixing zone;
   (b) contacting the resin with nitrogen gas in the melt-conveying zone; and
   (c) conveying the resin through a mixer discharge to form pellets.

2. A process for pelletizing polyethylene resin, the process comprising:
   (a) conveying polyethylene resin in a downstream direction through a mixer having a feed zone, a melt-mixing zone downstream of the feed zone, and a melt-conveying zone downstream of the melt-mixing zone;
   (b) providing nitrogen gas in a downstream portion of the melt-conveying zone and flowing in an upstream direction, the flow of nitrogen gas contacting the resin in the melt-conveying zone; and
   (c) conveying the resin through a mixer discharge to form pellets.

3. The process of claim 1 or 2, wherein the nitrogen gas is provided in an amount of from 1 to 30 SCFM.

4. A process of producing a polyethylene film, the process comprising:
   (a) providing a pelletized polyethylene resin by:
      (i) conveying polyethylene resin in a downstream direction through a mixer having a feed zone, a melt-mixing zone downstream of the feed zone, and a melt-conveying zone downstream of the melt-mixing zone;
      (ii) contacting the resin with nitrogen gas in the melt-conveying zone; and
      (iii) conveying the resin through a mixer discharge to form pellets, and
   (b) melt extruding the pellets in a blown or cast film process to form a film.

5. A process for producing a polyethylene film, the process comprising:
   (a) providing a pelletized resin by:
      (i) conveying polyethylene resin in a downstream direction through a mixer having a feed zone, a melt-mixing zone downstream of the feed zone, and a melt-conveying zone downstream of the melt-mixing zone;
      (ii) providing nitrogen gas in a downstream portion of the melt-conveying zone and flowing in an upstream direction, the flow of nitrogen gas contacting the resin in the melt-conveying zone; and
      (iii) conveying the resin through a mixer discharge to form pellets, and
   (b) melt extruding the pellets in a blown or cast film process to form a film.

6. The process of claim 4 or 5, wherein the nitrogen gas is provided in an amount of from 1 to 30 SCFM.

7. A process for decreasing the number of black specks formed in producing pelletized polyethylene resin, the process comprising:

(a) conveying polyethylene resin in a downstream direction through a mixer having a feed zone, a melt-mixing zone downstream of the feed zone, and a melt-conveying zone downstream of the melt-mixing zone;

(b) contacting the resin with nitrogen gas in the melt-conveying zone, the nitrogen gas being present in an amount sufficient to reduce the number of black specks formed in the resin; and (c) conveying the resin through a mixer discharge to form pellets.

8. A process for decreasing the number of gels formed in producing a polyethylene film, the process comprising:

(a) providing a pelletized polyethylene resin by:
  (i) conveying polyethylene resin in a downstream direction through a mixer having a feed zone, a melt-mixing zone downstream of the feed zone, and a melt-conveying zone downstream of the melt-mixing zone;
  (ii) contacting the resin with nitrogen gas in the melt-conveying zone; and
  (iii) conveying the resin through a mixer discharge to form pellets, and (b) melt extruding the pellets in a blown or cast film process to form a film, wherein the amount of nitrogen gas provided in step (a)(ii) is sufficient to reduce the number of gels formed in the film.

9. A process of producing a molded polyethylene article, the process comprising:

(a) providing a pelletized polyethylene resin by:
  (i) conveying polyethylene resin in a downstream direction through a mixer having a feed zone, a melt-mixing zone downstream of the feed zone, and a melt-conveying zone downstream of the melt-mixing zone;
  (ii) contacting the resin with nitrogen gas in the melt-conveying zone; and
  (iii) conveying the resin through a mixer discharge to form pellets, and (b) injection or blow molding the pellets to form a molded article.

* * * * *